March 22, 1938.                E. KOTTUSCH                2,112,103
                                 OIL RING
                            Filed Sept. 11, 1935
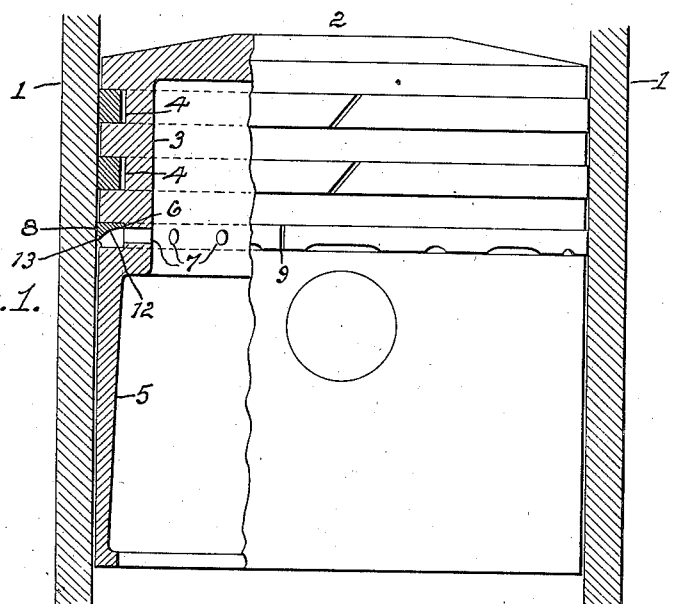
Fig. 1.
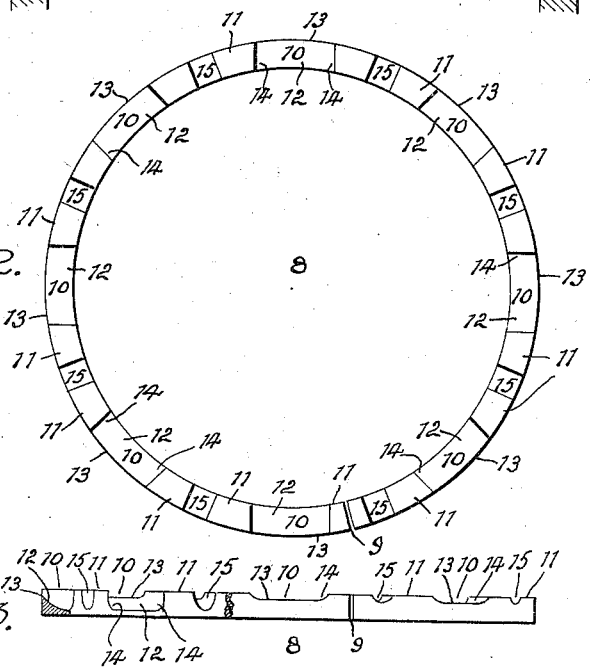
Fig. 2.
Fig. 3.
INVENTOR
Emil Kottusch,
BY
Bartlett & Bartlett
ATTORNEYS Patented Mar. 22, 1938

2,112,103

UNITED STATES PATENT OFFICE 2,112,103

OIL RING

Emil Kottusch, Detroit, Mich., assignor to Sylvan R. White, Detroit, Mich.

Application September 11, 1935, Serial No. 40,031

1 Claim. (Cl. 309—45)

This invention relates to piston rings, and more particularly to an oil ring to prevent the piston from pumping oil. The main object of the present invention is to provide a ring construction whereby oil will be effectually scraped from the cylinder wall and discharged into the interior of the piston and whereby the surfaces are so shaped as to impart to the oil a force and direction of flow which will insure its effectual discharge through openings in the piston wall at the bottom or inner side of the groove in which the ring is positioned. A further object is to provide a ring for the purpose, having a maximum number of scraping instrumentalities and yet has the necessary cross-sectional strength, and to provide certain other new and useful features in the construction, all as hereinafter more fully described, reference being had to the accompanying drawing in which Figure 1 is a sectional view of an engine cylinder, showing a piston therein, partly in longitudinal section and partly in elevation with a ring in place thereon, illustrative of an embodiment of the present invention;

Fig. 2 is a bottom plan view of the ring detached; and

Fig. 3 is an edge view of the ring broken away and partly in section.

In Fig. 1 of the drawing, I indicates the cylinder wall and 2 the piston as a whole, said piston comprising the usual head 3 formed with external grooves 4 and a depending skirt 5, the lower groove 6 being adapted to receive an oil ring embodying the present invention and the wall of the piston head at the bottom or inner side of this lower groove being formed with a series of openings 7 to permit the escape from said groove, of oil scraped from the surface of the cylinder wall, by said oil ring which is indicated as a whole by the numeral 8.

This oil ring 8 is cast in the usual manner of forming piston rings and split transversely as at 9 to provide the desired yielding action, and at its lower side, or that side which is toward the piston skirt when the ring is operatively installed, said ring is notched or cut away at intervals as at 10 leaving between these notches, lugs or piers 11 of a depth to fit closely within the groove 6, contacting the upper and lower side wall of said groove. The bottom surface 12 of each notch is curved transversely and inwardly and upwardly of the ring, each notch cutting through the outer side or face of the ring at a short distance above the lower side of the ring groove and forming a sharp cutting edge 13 adapted to effectually cut or scrape the oil from the wall of the cylinder upon the down stroke of the piston, the opposite or inner edge of each notch cutting through the inner side or face of the ring adjacent but below the upper side of the ring, so that oil scraped from the cylinder wall by said sharp edge of each notch will flow across the inwardly and upwardly curved surface 12 of the notch with an even curved flow and without a swirling action and be directed directly into the open end of the opening 7 opposite the notch, the curvature of said surface 12 directing the flow directly into said opening without turbulence and with a gradual bend in the flow. The directing of this oil flow into the openings 7 is further aided by curving the meeting angle of the ends of the surface 12 of each notch and the ends of the adjacent piers 11, as at 14, thus further lessening turbulence and aiding in the machining of these notches, such machining being made very simple by the employment of a circular cutter, cutting transversely of the ring, and by reason of the curved periphery of the cutter, simultaneously forming the transversely curved surface 12.

The scraping action of the ring is further enhanced and at the same time its strength efficiency maintained, by forming each of the piers 11 with a transverse groove 15, the bottom of which is curved longitudinally or transversely of the ring, the meeting angle of the outer end of each groove and outer surface of the pier being sharp and forming a sharp cutting edge similar to the edges 13 of the notches 10, the bottom of each groove curving inwardly and upwardly in a manner similar to the notches 10, and these grooves, like said notches may be expeditiously formed by a circular cutter cutting transversely of the ring. The machining of the ring is thus expedited and cost of production lowered by so shaping both notches and grooves that they may be quickly formed by means of simple rotary cutters, and by rounding the meeting angles of the bottoms of the grooves and notches with the adjacent portions of the piers, the ring is given the desired strength while providing a large number of oil receiving openings in its lower side.

Obviously changes may be made in the particular arrangement of notches, grooves and piers and in the shape of the same, within the scope of the appended claim, without departing from the spirit of the invention, and such changes are contemplated.

Having thus fully described my invention what I claim is:

An oil ring formed with a plurality of spaced apart notches in its lower side with piers between said notches of the full vertical depth of the ring to contact the upper and lower side walls of a piston groove, the bottom surface of each notch being curved transversely of the ring and upwardly toward the inner surface of the ring, each notch cutting through the outer side face of the ring at a short distance above the lower side face of the ring and forming a sharp cutting edge to scrape oil from the wall of a cylinder, the opposite or inner edge of each notch cutting through the inner side of the ring adjacent to and below the upper side surface of the ring, the end surfaces of each notch forming the side surfaces of adjacent piers and curved in cross section with said end surfaces of each notch extending across the ring in parallelism, whereby each notch may be formed by means of a rotary cutter cutting transversely of the ring, each of the piers between said notches being formed with a groove extending transversely of the ring and curved in cross section and curved transversely of the ring and upwardly thereof toward the inner side surface of the ring.

EMIL KOTTUSCH.